United States Patent
Tomioka

(10) Patent No.: US 7,529,173 B2
(45) Date of Patent: May 5, 2009

(54) OPTICAL DISC DEVICE, CIRCUIT FOR OPTICAL DISC DEVICE, WOBBLE SIGNAL REPRODUCTION METHOD, AND LAND PRE-PIT SIGNAL REPRODUCTION METHOD

(75) Inventor: Koji Tomioka, Sagamihara (JP)

(73) Assignee: Asahi Kasei Microsystems Co., Ltd., Tokyo (JP)

( * ) Notice: Subject to any disclaimer, the term of this patent is extended or adjusted under 35 U.S.C. 154(b) by 454 days.

(21) Appl. No.: 10/556,470

(22) PCT Filed: May 12, 2004

(86) PCT No.: PCT/JP2004/006392

§ 371 (c)(1),
(2), (4) Date: Nov. 10, 2005

(87) PCT Pub. No.: WO2004/100138

PCT Pub. Date: Nov. 18, 2004

(65) Prior Publication Data
US 2006/0280058 A1 Dec. 14, 2006

(30) Foreign Application Priority Data
May 12, 2003 (JP) .............................. 2003-132898

(51) Int. Cl.
*G11B 7/005* (2006.01)
(52) U.S. Cl. ................. 369/124.12; 369/44.13
(58) Field of Classification Search ........................ None
See application file for complete search history.

(56) References Cited

U.S. PATENT DOCUMENTS

| | | | |
|---|---|---|---|
| 5,930,222 A | | 7/1999 | Yoshida et al. |
| 6,081,490 A | * | 6/2000 | Kuroda et al. ............ 369/47.28 |
| 6,337,838 B1 | * | 1/2002 | Hikima et al. ............ 369/53.31 |
| 6,345,018 B1 | * | 2/2002 | Maegawa et al. ......... 369/44.13 |
| 6,603,726 B1 | * | 8/2003 | Yoshida et al. .......... 369/124.01 |

(Continued)

FOREIGN PATENT DOCUMENTS

JP 10-283638 10/1998

(Continued)

OTHER PUBLICATIONS

Japanese Patent Office, Decision to Grant a Patent in JP 2005-506024, dated Oct. 28, 2008 (2 pages).

*Primary Examiner*—Michael V Battaglia
(74) *Attorney, Agent, or Firm*—Finnegan, Henderson, Farabow, Garrett & Dunner, L.L.P.

(57) ABSTRACT

A mark S/H circuit (66) samples, for example, a signal A generated as a photodetector (20) detects a return beam from marks of an optical disk (10), a space S/H circuit (68) samples a signal A generated through detection of a return beam from spaces, and amplifiers (70 and 72) justify amplitudes of the sampled A signals from the marks and spaces. A mark/space selector switch (74) selects alternately and combines the mark and space signals whose amplitudes have been justified. After A, B, C, and D signals A1 to D1 are subjected individually to a series of processes up to the combination process, a wobble processing circuit (80) adds them in predetermined combinations, finds differences among the added signals after justifying the amplitudes of the added signals, and thereby reproduces a wobble signal (107).

14 Claims, 9 Drawing Sheets

U.S. PATENT DOCUMENTS

| | | |
|---|---|---|
| 6,891,782 B1 | 5/2005 | Saito et al. |
| 6,937,542 B1 | 8/2005 | Ogawa |
| 7,050,363 B2 * | 5/2006 | Otsuka et al. ............ 369/44.13 |
| 2001/0055247 A1 * | 12/2001 | Tateishi et al. ........... 369/44.32 |
| 2002/0097991 A1 * | 7/2002 | Tanaka ....................... 386/126 |
| 2004/0052177 A1 * | 3/2004 | Maegawa ................. 369/47.51 |
| 2004/0160880 A1 * | 8/2004 | Mashimo ................. 369/53.34 |

FOREIGN PATENT DOCUMENTS

| | | |
|---|---|---|
| JP | 2000-242940 A | 9/2000 |
| JP | 2001-134943 | 5/2001 |
| JP | 2002-216355 | 8/2002 |
| JP | 2002-245633 | 8/2002 |

* cited by examiner

PRIOR ART

PRIOR ART

PRIOR ART

PRIOR ART

OPTICAL DISC DEVICE, CIRCUIT FOR OPTICAL DISC DEVICE, WOBBLE SIGNAL REPRODUCTION METHOD, AND LAND PRE-PIT SIGNAL REPRODUCTION METHOD

TECHNICAL FIELD

The present invention relates to an optical disk device which records and plays back documents, images, music, or other data on/from an optical disk. More particularly, it relates to an optical disk device, circuit for an optical disk device, wobble signal reproduction method, and land pre-pit signal reproduction method suitable for detecting and reproducing a wobble signal and LPP (land pre-pit) signal recorded on a recordable/reproducible optical disk.

BACKGROUND ART

Currently, CD-R/RW, DVD-R/RW, DVD+R/RW, and the like are available as optical disks capable of high-density recording. When recording information on these recordable optical disks, a reference clock signal for writes cannot be generated from a reproduction signal used on conventional read-only disks.

Thus, a recordable optical disk is configured as shown in FIG. 8. FIG. 8 shows part of a DVD-R/RW disk surface. Grooves 12 for use to record information are formed spirally on the optical disk (hereinafter interchangeably referred to as a DVD-R/RW) 10, wobbling periodically with a fixed amplitude. They are called wobbles.

The grooves 12 are designed such that large volumes of pit data 14 which represent various information are written into it. Also, notches called land pre-pits (hereinafter referred to as LPP) 18 are provided in each land 16 between a groove 12 and groove 12 as also shown in FIG. 9.

Light reflected by the wobbling grooves 12 irradiated with a laser spot is detected by a four-part photodetector (split-type optical sensor) 20 in a push-pull fashion. Consequently, difference in light quantities is detected. The detected signal is called a wobble signal. A reference clock signal for writes can be generated from the wobble signal.

No address information is superimposed on the wobble signal of the optical disk 10 and an LPP signal obtained from the LPP 18 is used as address information. Where the LPP 18 is formed, the land is discontinuous. Consequently, the quantity of light entering the photodetector 20 increases sharply when the laser spot passes through the discontinuous part and as a result of push-pull operation, a pulsed signal is superimposed as the LPP signal on the wobble signal.

The wobble signal and LPP signal are used to control the rotational speed of the optical disk 10 and provide positional information. Recording/playback apparatus for optical disks 10 must detect the signals with high accuracy.

Generally, signals A, B, C, and D read from the optical disk 10 by the photodetector 20 have the following relationships. The wobble signal and LPP signal are extracted using arithmetic operations based on these relationships. On the optical disk 10 after recording, the A, B, C, and D signals contain an RF signal (waveform signal) component which represents difference in reflectance between marks 12a (i.e., pit data 14 in FIG. 8) and spaces 12b.

A=RF signal+first wobble signal+LPP signal

B=RF signal+second wobble signal (opposite in phase to the first wobble signal)

C=RF signal+second wobble signal (opposite in phase to the first wobble signal)

D=RF signal+first wobble signal+LPP signal

The RF signals in all the A, B, C, and D signals have the same phase and basically the same amplitude. The wobble signals in the A and D signals are opposite in phase to the wobble signals in the B and C signals. The LPP signal occurs only in the A and D signals (or B and C signals).

Due to these relationships, the arithmetic operation of (A+D)−(B+C) in principle cancels out the equiphase components, i.e., RF signals, leaving only the wobble signals and LPP signals. This is expressed as follows.

(A+D)−(B+C)

=(RF signal+first wobble signal+LPP signal+RF signal +first wobble signal+LPP signal)−(RF signal+second wobble signal+RF signal+second wobble signal)

=2×(RF signal+LPP signal+first wobble signal)−2×(RF signal+second wobble signal)

=2×LPP signal+4×first wobble signal (this is because the first wobble signal and second wobble signal are opposite in phase, and thus "first wobble signal=−second wobble signal")

Actually, however, due to variations in the sensitivity of the photodetector 20 as well as variations in amplifier gain, the A+D signal and B+C signal are not exactly equal in amplitude components of the RF signals. Therefore, the arithmetic operation is performed after equalizing the amplitude components of the RF signals by adjusting the gains of A+D signal and B+C signal. AGC (Automatic Gain Control) amplifiers are often used for the gain adjustment and are configured as in the case of a wobble processing circuit 30 shown in FIG. 11.

In the wobble processing circuit 30, an adder 31 adds the A signal and D signal while an adder 32 adds the B signal and C signal. An AGC amplifier 34 adjusts the gain of the A+D signal outputted from the adder 31 while an AGC amplifier 35 adjusts the gain of the B+C signal outputted from the adder 32. That is, the gains are adjusted in such a way as to equalize the amplitude components of the RF signals between the A+D signal and B+C signal. Then, a subtractor 37 subtracts the B+C signal from the A+D signal to output the (A+D)−(B+C), i.e., the wobble signal and LPP signal.

However, the optical disk 10 is recorded by changing light quantity between the marks 12a and spaces 12b according to recording data. Consequently, the wobble signal and LPP signal cannot be reproduced by simply detecting beams returning from the optical disk 10.

To deal with this situation, an S/H wobble processing circuit 40 is configured by connecting S/H (sample/hold) circuits 41 to 44 to the input side of the wobble processing circuit 30 as shown in FIG. 12.

Operation of the S/H wobble processing circuit 40 will be described with reference to a timing chart shown in FIG. 13. It is assumed here that the optical disk 10 is a compact disk.

First, during recording, in a segment in which recording data shown in (1) is High, i.e., in a segment of High state which specifies a mark 12a to be formed (in a mark segment), a laser beam directed at the optical disk 10 becomes strong corresponding to the High state to provide write power. That is, a waveform of a writing beam shown in (2) goes High, forming a mark 12a on the optical disk 10. In so doing, a waveform of a return beam used to read the A, B, C, and D signals goes High by rising sharply as shown in (3).

On the other hand, in a segment in which the recording data (1) is Low, i.e., in a segment of Low state which specifies a space 12b to be formed (in a space segment), a laser beam directed at the optical disk 10 becomes weak corresponding to the Low state to provide read power. That is, the waveform of the writing beam (2) goes Low. In this case, the waveform of the return beam is Low as shown in (3).

As the photodetector 20 detects the return beam with such a waveform as the one shown in (3), the S/H wobble processing circuit 40 generates the A, B, C, and D signals and inputs them in the S/H circuits 41 to 44. Then, the S/H wobble processing circuit 40 switches the level of an S/H switching signal 46 as shown in (4). Specifically, the S/H wobble processing circuit 40 samples the S/H switching signal 46 in High state in a segment in which the return beam is Low, and holds the S/H switching signal 46 Low in a segment in which the return beam is High. Consequently, output level of each of the S/H circuits 41 to 44 becomes Low as shown in (5). As the outputs are inputted in the adders 31 and 32, the subtractor 37 produces the (A+D)−(B+C) signal as the wobble signal.

In this way, conventional compact optical disks obtain a wobble signal by sampling space segments. The S/H wobble processing circuit 40 is capable of such processing because the wobble signal has a frequency of 22.05 KHz which is much lower than the recording data's frequency of 200 KHz to 720 KHz, and thus reproduction of the wobble signal is not much affected by the S/H process.

Conventional optical disk devices of this type include, for example, the one disclosed in Patent Document 1 described later. The optical disk device disclosed in Patent Document 1 performs sampling to reproduce a CD-R/RW wobble signal only when spaces are encountered, and then obtains a wobble signal by predetermined signal processing.

Besides, optical disk devices which use an LPP signal include, for example, the one disclosed in Patent Document 2 described later. The optical disk device disclosed in Patent Document 2 is mainly intended for DVD-R/RW and obtains the LPP signal by performing signal processing separately for marks and spaces. That is, the marks and spaces are separately subjected to signal processing, levels of the marks in binary terms are extracted by an LPF (Low Pass Filter), and AC voltages are added. Also, levels of the spaces in binary terms are sampled alone and extracted by an LPF, and AC voltages are added. Signals obtained by the additions of the AC voltages are binarized by a comparator, resulting values are ANDed, and thereby an LPP signal for each segment is detected. Finally, the LPP signals are ORed, and thereby LPP signals in both mark and space segments are reproduced.

However, conventional optical disk devices have the following problems. Since the technique disclosed in JP2002-216355A (pp. 5-7, FIG. 1; hereinafter referred to as Patent Document 1) samples only space segments being recorded, if LPP signals which serve as a reference for recording and reproducing operations are inserted as in the case of DVD-R/RW or the like, although the LPP signal recorded in the space segments can be reproduced, the LPP signal recorded in the mark segments cannot be reproduced.

Also, in the case of DVD+R/RW, since there is no land pre-pit and the wobble signal contains address information, the wobble signal must be reproduced with high quality. However, when the wobble signal and recording data are close in frequency as is the case with DVD+R/RW, if space segments alone are sampled, it is difficult to detect the wobble signal and thus it is not possible to reproduce high-quality wobble signal.

The technique disclosed in JP10-283638A (pp. 5-7, FIG. 1; hereinafter referred to as Patent Document 2) can reproduce only the LPP signal, and cannot reproduce the wobble signal.

That is, other means must be used to reproduce the wobble signal. Thus, in view of the above problems, it can be seen that the wobble signal and LPP signal should be reproduced both in mark segments and space segments. During recording on an optical disk, laser intensity varies between mark segments and space segments and naturally return beam intensity varies as well. Thus, in principle, the gain can be switched quickly in sync with return beams. To switch the gain, there is known, for example, a gain-switching wobble processing circuit 50 shown in FIG. 14.

Switching operation of the gain-switching wobble processing circuit 50 will be described with reference to a timing chart in FIG. 15. It is assumed here that the optical disk is a compact disk.

During recording, a waveform of a writing beam shown in (2) becomes High or Low depending on whether recording data shown in (1) is High or Low. Consequently, a waveform of a return beam goes High by rising sharply as shown in (3).

As a photodetector detects a return beam with such a waveform, the gain-switching wobble processing circuit 50 generates A, B, C, and D signals and inputs them in gain switching circuits 51 to 54. Then, the gain-switching wobble processing circuit 50 switches the level of a gain-switching signal 56 as shown in (4). Specifically, the gain-switching wobble processing circuit 50 switches the gain by setting the switching signal 56 High (increase the gain) in a segment in which the waveform of the return beam is Low and setting the switching signal 56 Low (decreases the gain) in a segment in which the waveform of the return beam is High. Consequently, the output level of the gain switching circuits 51 to 54 becomes constant in all segments as shown in (5). As the outputs are inputted in adders 31 and 32, a subtractor 37 produces an (A +D)−(B+C) signal as the wobble signal and LPP signal.

However, when the gain is switched quickly, although there is no problem if there is no timing offset between the gain switching and the return beam as in the case of segment SE1, if there is a timing offset between the gain switching and the return beam as in the case of segment SE2, unnecessary pulsed signal components such as those indicated by P1 and P2 are included when the gain is switched, degrading the quality of the wobble signal and LPP signal.

To solve this problem, the gain should be switched very quickly with highly accurate timing. Actually, however, it is difficult to achieve such timing adjustment in view of temperature variations and the like.

A write-once medium such as -R or +R contains much noise at the beginning of recording segments due to a large input signal or electrical overshoot. This may degrade signal quality.

The present invention has been made in view of the above problems and has an object to provide an optical disk device, circuit for an optical disk device, wobble signal reproduction method, and land pre-pit signal reproduction method which can reproduce a wobble signal and LPP signal with high quality.

DISCLOSURE OF THE INVENTION

According to the present invention, there is provided an optical disk device which reproduces a wobble signal, i.e., information about wobbling of the tracks, from an optical disk that has information-recording tracks formed spirally from inner radius to outer radius of the disk, wobbling periodically, characterized by comprising: mark forming means which forms marks on the tracks by laser irradiation according to recording data; a split-type optical sensor which outputs multiple systems of signals by detecting return beams from the marks as well as from spaces between the marks; first sampling means which samples, in mark segments, the signals outputted from the split-type optical sensor and outputs the sampled signals; second sampling means which samples, in space segments, the signals outputted from the split-type optical sensor and outputs the sampled signals; and selection means which alternately selects and outputs the signals sampled and outputted by the first and second sampling means.

Thus, in DVD+R/RW or the like which uses a wobble signal, signals obtained by detecting return beams from marks and spaces of the optical disk are sampled in mark segments and space segments and resulting signals are selected and outputted alternately. The signals from the marks and spaces can be combined properly by combining the signals outputted alternately.

According to the present invention, there is provided an optical disk device which reproduces a land pre-pit signal from an optical disk that has information-recording tracks formed spirally from inner radius to outer radius of the disk, wobbling periodically, with land pre-pits for reproduction of address information being formed between the tracks, characterized by comprising: mark forming means which forms marks on the tracks by laser irradiation according to recording data; a split-type optical sensor which outputs multiple systems of signals by detecting return beams from the marks as well as from spaces between the marks; first sampling means which samples, in mark segments, the signals outputted from the split-type optical sensor and outputs the sampled signals; second sampling means which samples, in space segments, the signals outputted from the split-type optical sensor and outputs the sampled signals; and selection means which alternately selects and outputs the signals sampled and outputted by the first and second sampling means.

Thus, in DVD-R/RW or the like which uses a land pre-pit signal, a signal obtained by detecting return beams from marks and spaces of the optical disk are sampled in mark segments and space segments and resulting signals are selected and outputted alternately. The signals from the marks and spaces can be combined properly by combining the signals outputted alternately.

According to the present invention, the optical disk device first described above is characterized by comprising reproducing means which adds the multiple systems of signals subjected to a series of processes by the first sampling means, the second sampling means, and the selection means, in predetermined combinations, finds differences among the added signals after justifying amplitudes of the added signals, and thereby reproduces the wobble signal.

Thus, the signals from the marks and spaces are selected alternately, the signals are added, the amplitudes of the added signals are justified, and the differences among the added signals are found, thereby to reproduce the wobble signal. This makes it possible to obtain the wobble signal by combining the signals from the marks and spaces properly.

According to the present invention, the optical disk device is characterized by comprising reproducing means which adds the multiple systems of signals subjected to a series of processes by the first sampling means, the second sampling means, and the selection means, in predetermined combinations, finds differences among the added signals after justifying amplitudes of the added signals, and thereby reproduces the land pre-pit signal.

Thus, the signals from the marks and spaces are selected alternately, the signals are added, the amplitudes of the added signals are justified, and the differences among the added signals are found, thereby to reproduce the land pre-pit signal. This makes it possible to obtain the land pre-pit signal by combining the signals from the marks and spaces properly.

According to the present invention, the optical disk devices are characterized by comprising first amplitude adjusting means which justifies amplitudes of the signals sampled and outputted by the first sampling means.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

According to the present invention, in the optical disk devices, the first amplitude adjusting means controls gain based on difference between light quantity of a return beam from the marks and light quantity of a return beam from the spaces.

This makes it possible to justify the amplitudes of the sampled signals with high accuracy.

According to the present invention, the optical disk devices are characterized by comprising second amplitude adjusting means which justifies amplitudes of the signals sampled and outputted by the second sampling means.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

According to the present invention, in the optical disk devices, the second amplitude adjusting means controls gain based on difference between light quantity of a return beam from the marks and light quantity of a return beam from the spaces.

This makes it possible to justify the amplitude of the sampled signals with high accuracy.

According to the present invention, the optical disk devices are characterized by comprising timing generating means which generates a control signal for use to control timing for the first sampling means to sample the signals outputted from the split-type optical sensor in mark segments, a control signal for use to control timing for the second sampling means to sample the signals outputted from the split-type optical sensor in space segments, and a control signal for use to control timing for the selection means to alternately select the signals outputted from the first and second sampling means, according to the recording data.

This makes it possible to properly control the operation of sampling the signals in mark segments and space segments and selecting and outputting them alternately, where the signals are obtained by detecting the return beams from the marks and spaces of the optical disk.

According to the present invention, in the optical disk devices, when the signals from the marks are sampled by the first sampling means, sampling segments are set shorter than signal segments of the marks so that the sampling segments will fit in the signal segments; and when the signals from the spaces are sampled by the second sampling means, sampling segments are set shorter than signal segments of the spaces so that the sampling segments will fit in the signal segments.

Thus, the signals obtained by detecting the return beams from the marks and spaces of the optical disk can be sampled reliably in the mark segments and space segments.

According to the present invention, in the optical disk devices, both the first and second sampling means have a switch used to sample the signals outputted from the split-type optical sensor and a capacitor connected to an output end of the switch and used to hold the sampled signals.

This makes it possible to implement the sampling means with a simple configuration consisting of a switch and capacitor.

According to the present invention, in the optical disk devices, the first sampling means samples the signals in the mark segments by turning on the switch and charging the capacitor with electrical charge of the signals outputted from the split-type optical sensor and holds the signals in the spaces by turning off the switch and outputting the electrical charge; and the second sampling means samples the signals in the spaces by turning on the switch and charging the capacitor with electrical charge of the signals outputted from the split-type optical sensor and holds the signals in the marks by turning off the switch and outputting the electrical charge.

This makes it possible to implement the sampling means which samples and holds the signals outputted from the split-type optical sensor, with a simple configuration consisting of a switch and capacitor.

According to the present invention, in the optical disk devices, the first sampling means has a low pass filter.

This makes it possible to remove sharp noise components liable to occur on rising edges of marks.

According to the present invention, in the optical disk devices, the selection means has a switch used to alternately select the signals sampled and outputted by the first and second sampling means and a capacitor used to hold the selected signals.

This makes it possible to implement the selection means with a simple configuration consisting of a switch and capacitor.

According to the present invention, there is provided a circuit for an optical disk device intended for an optical disk which has information-recording tracks formed spirally from inner radius to outer radius of the disk, wobbling periodically, where the optical disk device forms marks on the tracks by laser irradiation according to recording data, outputs multiple systems of signals by detecting return beams from the marks as well as from spaces between the marks using a split-type optical sensor, and thereby reproduces a wobble signal, i.e., information about wobbling of the tracks, characterized by comprising: first sampling means which samples, in mark segments, the signals outputted from the split-type optical sensor and outputs the sampled signals; second sampling means which samples, in space segments, the signals outputted from the split-type optical sensor and outputs the sampled signals; and selection means which alternately selects and outputs the signals sampled and outputted by the first and second sampling means.

Thus, in DVD+R/RW or the like which uses a wobble signal, a signal obtained by detecting return beams from marks and spaces of the optical disk are sampled in mark segments and space segments and resulting signals are selected and outputted alternately. The signals from the marks and spaces can be combined properly by combining the signals outputted alternately.

According to the present invention, there is provided a circuit for an optical disk device intended for an optical disk which has information-recording tracks formed spirally from inner radius to outer radius of the disk, wobbling periodically, where the optical disk device forms marks on the tracks by laser irradiation according to recording data, outputs multiple systems of signals by detecting return beams from the marks as well as from spaces between the marks using a split-type optical sensor, and thereby reproduces a wobble signal, i.e., information about wobbling of the tracks, characterized by comprising: first sampling means which samples, in mark segments, the signals outputted from the split-type optical sensor and outputs the sampled signals; second sampling means which samples, in space segments, the signals outputted from the split-type optical sensor and outputs the sampled signals; and selection means which alternately selects and outputs the signals sampled and outputted by the first and second sampling means.

Thus, in DVD-R/RW or the like which uses a wobble signal, a signal obtained by detecting return beams from marks and spaces of the optical disk are sampled in mark segments and space segments and resulting signals are selected and outputted alternately. The signals from the marks and spaces can be combined properly by combining the signals outputted alternately.

According to the present invention, the circuit for an optical disk device is characterized by comprising reproducing means which adds the multiple systems of signals subjected to a series of processes by the first sampling means, the second sampling means, and the selection means, in predetermined combinations, finds differences among the added signals after justifying amplitudes of the added signals, and thereby reproduces the wobble signal.

Thus, the signals from the marks and spaces are selected alternately, the signals are added, the amplitudes of the added signals are justified, and the differences among the added signals are found, thereby to reproduce the wobble signal. This makes it possible to obtain the wobble signal by combining the signals from the marks and spaces properly.

According to the present invention, the circuit for an optical disk device is characterized by comprising reproducing means which adds the multiple systems of signals subjected to a series of processes by the first sampling means, the second sampling means, and the selection means, in predetermined combinations, finds differences among the added signals after justifying amplitudes of the added signals, and thereby reproduces the land pre-pit signal.

Thus, the signals from the marks and spaces are selected alternately, the signals are added, the amplitudes of the added signals are justified, and the differences among the added signals are found, thereby to reproduce the wobble signal. This makes it possible to obtain the land pre-pit signal by combining the signals from the marks and spaces properly.

According to the present invention, the circuit for an optical disk device is characterized by comprising first amplitude adjusting means which justifies amplitudes of the signals sampled and outputted by the first sampling means.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

According to the present invention, the circuit for an optical disk device is characterized by comprising second amplitude adjusting means which justifies amplitudes of the signals sampled and outputted by the second sampling means.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

According to the present invention, there is provided a wobble signal reproduction method for reproducing a wobble signal, i.e., information about wobbling of tracks, from an optical disk that has information-recording tracks formed spirally from inner radius to outer radius of the disk, wobbling periodically, characterized by comprising: a first step of forming marks on the tracks by laser irradiation according to recording data; a second step of outputting multiple systems of signals by detecting return beams from the marks formed in the first step as well as from spaces between the marks, with a split-type optical sensor; a third step of sampling, in mark segments, the signals outputted from the split-type optical sensor and outputting the sampled signals; a fourth step of sampling, in space segments, the signals outputted from the split-type optical sensor and outputting the sampled signals; and a fifth step of alternately selecting and outputting the signals sampled and outputted in the first and second sampling steps.

Thus, in DVD+R/RW or the like which uses a wobble signal, a signal obtained by detecting return beams from marks and spaces of the optical disk are sampled in mark segments and space segments and resulting signals are selected and outputted alternately. This makes it possible to reproduce the wobble signal properly from the output signals.

According to the present invention, the wobble signal reproduction method is characterized by further comprising a sixth step of adding the multiple systems of signals subjected to a series of processes in the third, fourth, and fifth steps, in predetermined combinations, finding differences among the added signals after justifying amplitudes of the added signals, and thereby reproducing the wobble signal.

Thus, the signals from the marks and spaces are selected alternately, the signals are added, the amplitudes of the added signals are justified, and the differences among the added signals are found, thereby to reproduce the wobble signal. This makes it possible to obtain the wobble signal by combining the signals from the marks and spaces properly.

According to the present invention, the wobble signal reproduction method is characterized by further comprising a seventh step of justifying amplitudes of the signals sampled and outputted in the mark segments and space segments.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

According to the present invention, there is provided a land pre-pit signal reproduction method for reproducing a land pre-pit signal from an optical disk that has information-recording tracks formed spirally from inner radius to outer radius of the disk, wobbling periodically, with land pre-pits for reproduction of address information being formed between the tracks, characterized by comprising: a first step of forming marks on the tracks by laser irradiation according to recording data; a second step of outputting multiple systems of signals by detecting return beams from the marks formed in the first step as well as from spaces between the marks, with a split-type optical sensor; a third step of sampling, in mark segments, the signals outputted from the split-type optical sensor and outputting the sampled signals; a fourth step of sampling, in space segments, the signals outputted from the split-type optical sensor and outputting the sampled signals; and a fifth step of alternately selecting and outputting the signals sampled and outputted in the first and second sampling steps.

Thus, in DVD-R/RW or the like which uses a wobble signal, a signal obtained by detecting return beams from marks and spaces of the optical disk are sampled in mark segments and space segments and resulting signals are selected and outputted alternately. This makes it possible to reproduce the land pre-pit signal properly from the output signals.

According to the present invention, the land pre-pit signal reproduction method is characterized by further comprising a sixth step of adding the multiple systems of signals subjected to a series of processes in the third, fourth, and fifth steps, in predetermined combinations, finding differences among the added signals after justifying amplitudes of the added signals, and thereby reproducing the land pre-pit signal.

Thus, the signals from the marks and spaces are selected alternately, the signals are added, the amplitudes of the added signals are justified, and the differences among the added signals are found, thereby to reproduce the wobble signal. This makes it possible to obtain the wobble signal by combining the signals from the marks and spaces properly.

According to the present invention, the land pre-pit signal reproduction method is characterized by further comprising a seventh step of justifying amplitudes of the signals sampled and outputted in the mark segments and space segments.

Thus, the sampled signals are selected alternately after their amplitudes are justified. Consequently, signals of basically the same potential are selected alternately, eliminating the need to set switch timing for the selection accurately or use high switching speed. This makes it possible to combine the signals from the marks and spaces easily and properly.

BEST MODE FOR CARRYING OUT THE INVENTION

An embodiment of the present invention will be described with reference to the drawings.

Figure 1:
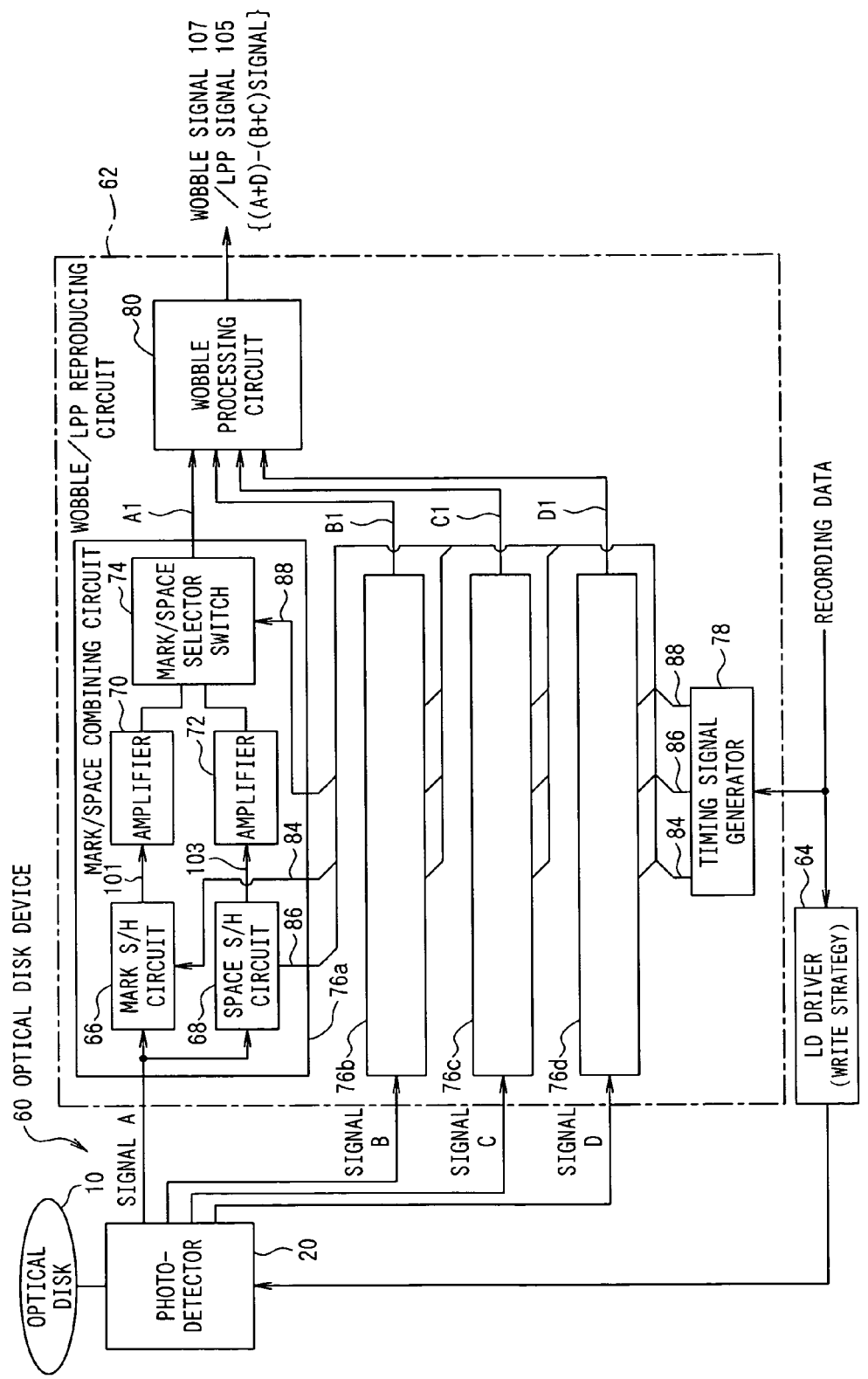
FIG. 1 is a block diagram showing an optical disk device according to an embodiment of the present invention.
Figure 8:
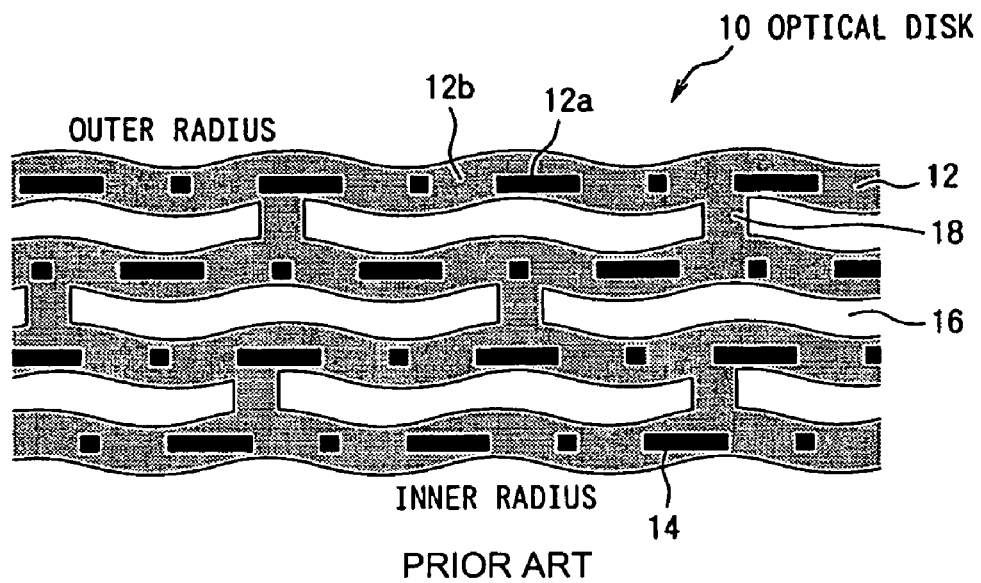
FIG. 8 is a diagram showing a configuration of an optical disk.
Figure 9:
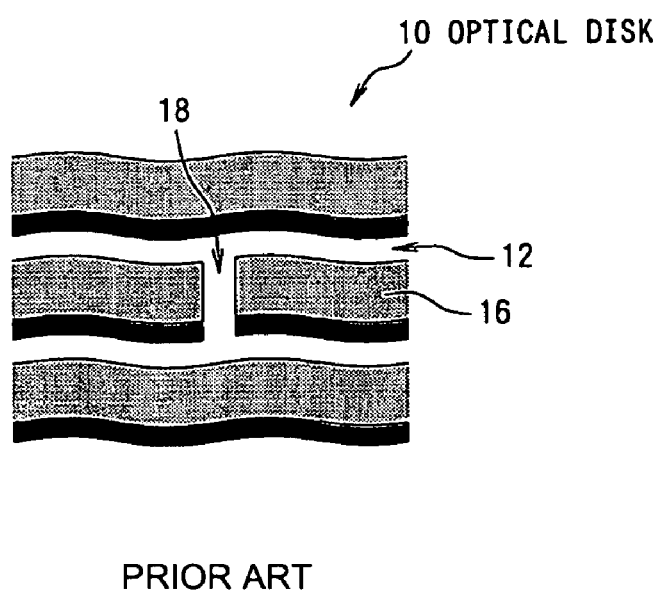
FIG. 9 is an enlarged view of grooves, lands, and LPP on an optical disk.
Figure 10:
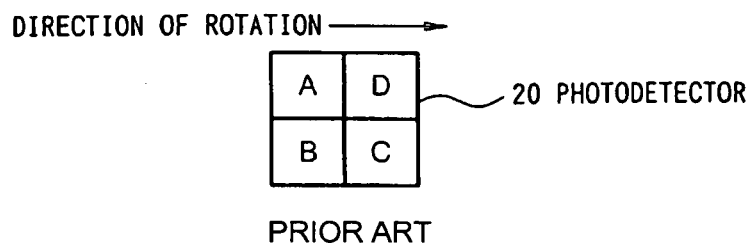
FIG. 10 is a conceptual view of a photodetector (split-type optical sensor)

FIG. 1 is a block diagram showing an optical disk device according to an embodiment of the present invention. The optical disk device 60 in FIG. 1 comprises an optical disk 10, a photodetector 20 which outputs A, B, C, and D signals by detecting them from the optical disk 10, a wobble/LPP reproducing circuit 62 which reproduces a wobble signal and LPP signal from the A, B, C, and D signals outputted from the photodetector 20, and an LD driver 64 which controls laser intensity (write strategy control) according to recording data during writes to the optical disk 10. It is assumed here that the optical disk 10 is a DVD-R/RW shown in FIGS. 8 and 9.

Figure 11:
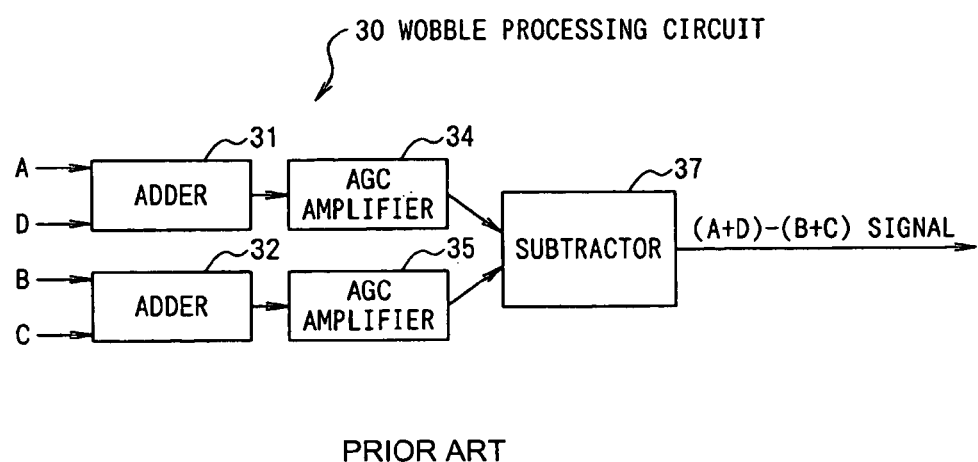
FIG. 11 is a block diagram showing a configuration of an wobble processing circuit.
Figure 12:
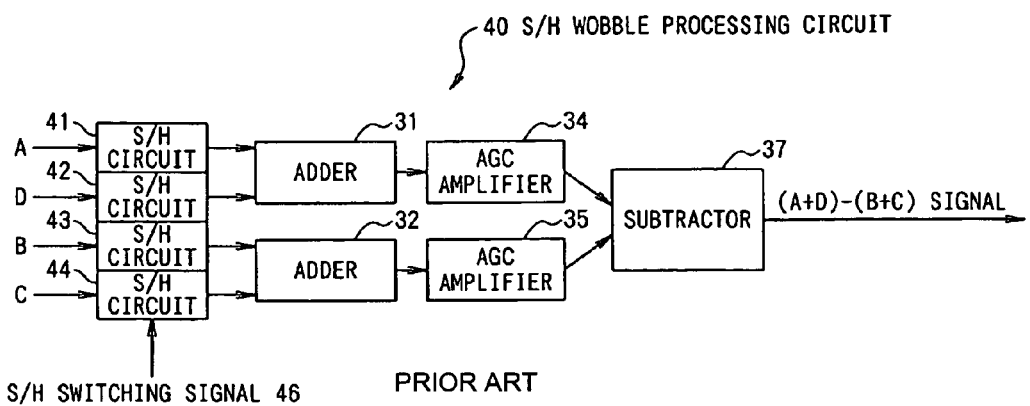
FIG. 12 is a block diagram showing a configuration of an S/H wobble processing circuit.
Figure 13:
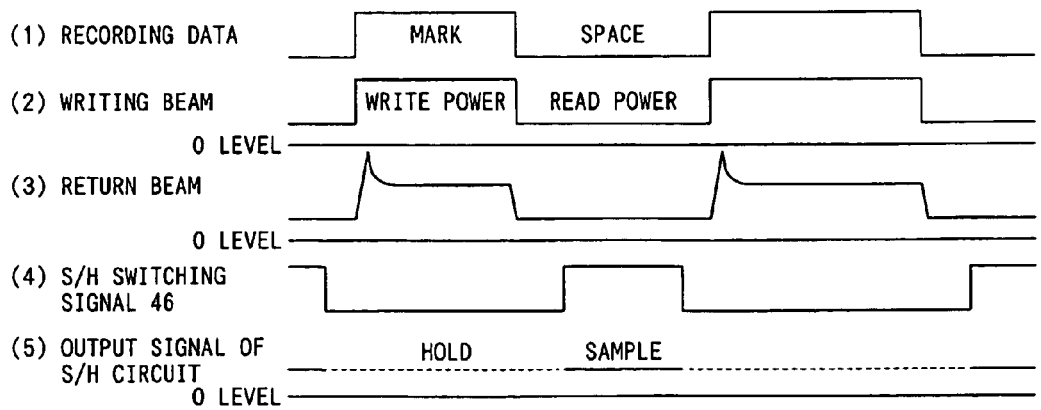
FIG. 13 is a timing chart illustrating the operation of sampling and holding return beams by the S/H wobble processing circuit.
Figure 14:
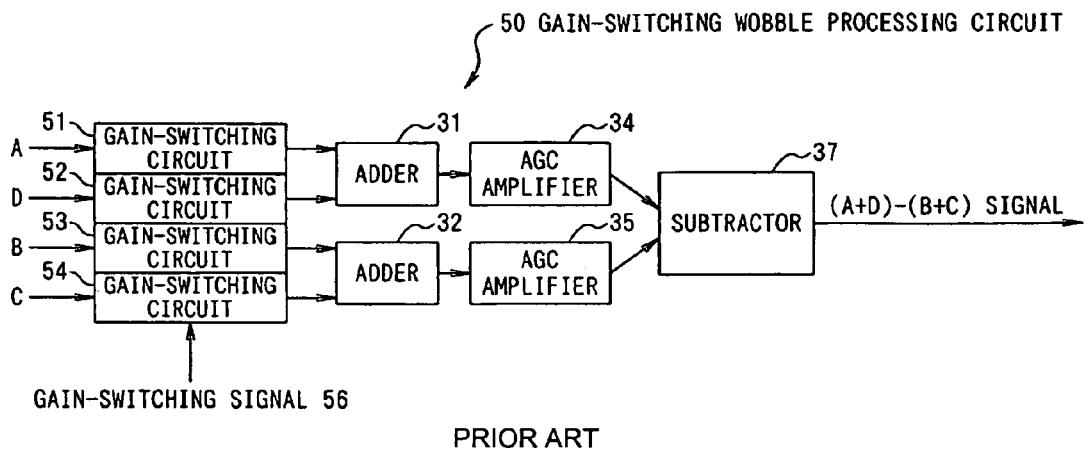
FIG. 14 is a block diagram showing a configuration of a gain-switching wobble processing circuit.
Figure 15:
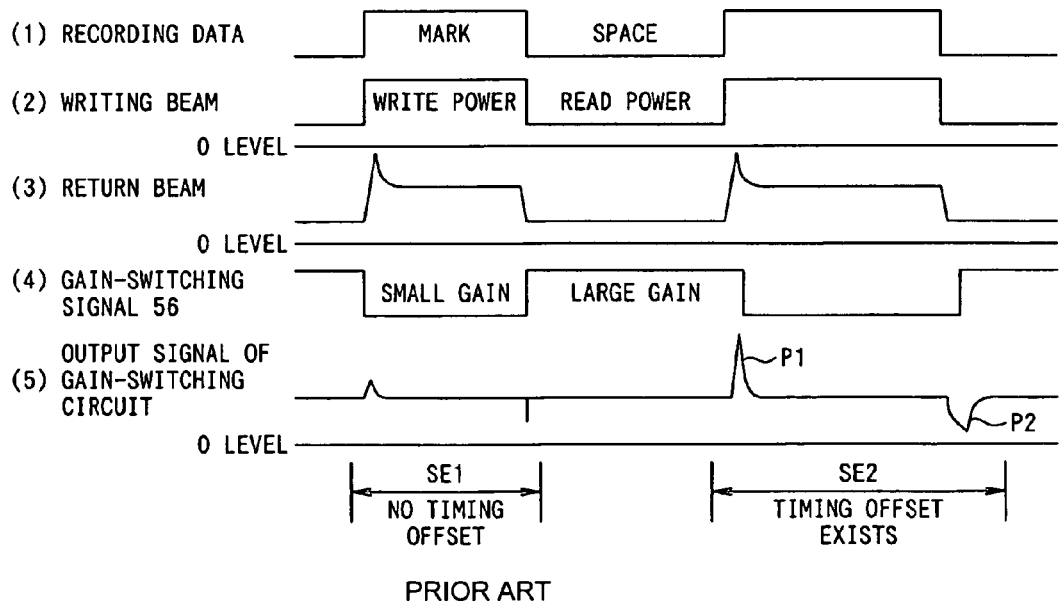
FIG. 15 is a timing chart illustrating the operation of sampling and holding return beams by the gain-switching wobble processing circuit.

The wobble/LPP reproducing circuit 62 comprises a mark/space combining circuit 76a for the A signal, a mark/space combining circuit 76b for the B signal, a mark/space combining circuit 76c for the C signal, a mark/space combining circuit 76d for the D signal, a timing signal generator 78, and a wobble processing circuit 80, where each of the mark/space combining circuits 76a, 76b, 76c, and 76d comprises a mark S/H circuit 66, an space S/H circuit 68, and amplifiers 70 and 72 and mark/space selector switch 74. It is assumed here that the wobble processing circuit 80 is the same as the wobble processing circuit 30 shown in FIG. 11.

These components will be described next.

The timing signal generator 78 generates, according to recording data, a mark S/H switching signal 84 to be outputted to the mark S/H circuit 66 of the mark/space combining circuits 76a to 76d for the A, B, C, and D signals; a space S/H switching signal 86 to be outputted to the space S/H circuit 68; and a mark/space combining signal 88 to be outputted to a mark/space selector switch 74.

The mark/space combining circuit 76a for the A signal will be described by representing the mark/space combining circuits 76a to 76d for the A, B, C, and D signals.

Figure 2:
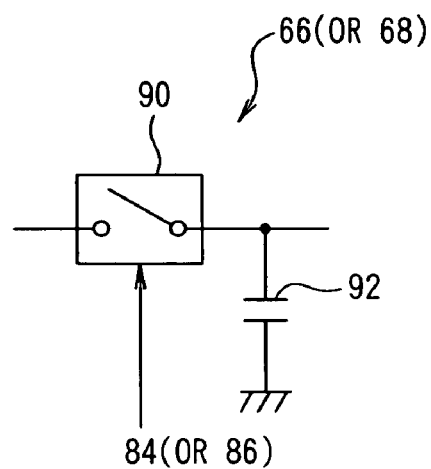
FIG. 2 is a diagram showing a configuration example of an S/H circuit of the optical disk device according to the embodiment.

As shown in FIG. 2, the mark S/H circuit 66 consists of a switch 90 which is connected to a signal path and is turned on and off according to the mark S/H switching signal 84 and a capacitor 92 connected between a signal path downstream of the switch 90 and the earth. When the switch 90 is ON, the A signal produced by a return beam from marks 12a on the optical disk 10 and detected by the photodetector 20 is sampled and outputted to the amplifier 70. When the switch 90 is OFF, the A signal is held as electrical charge of the A signal stored in the capacitor 92 is outputted to the amplifier 70.

The space S/H circuit 68 has the same configuration as the one shown in FIG. 2. It consists of a switch 90 which is connected to a signal path and is turned on and off according to the space S/H switching signal 86 and a capacitor 92 connected between a signal path downstream of the switch 90 and the earth. When the switch 90 is ON, the A signal produced by a return beam from spaces 12b on the optical disk 10 and detected by the photodetector 20 is outputted to the amplifier 70. When the switch 90 is OFF, the A signal is held as electrical charge of the A signal stored in the capacitor 92 is outputted to the amplifier 70.

Figure 4:
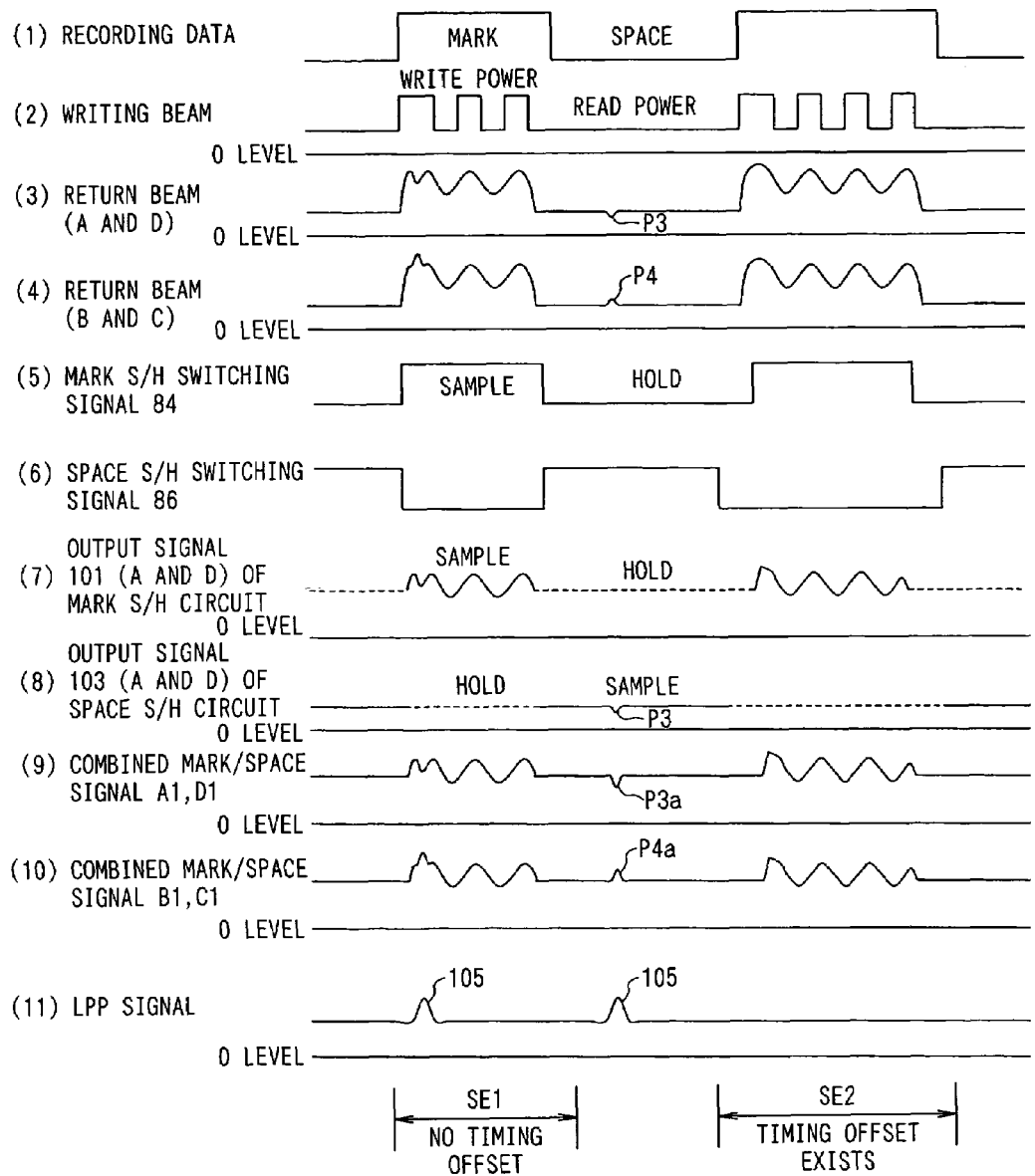
FIG. 4 is a timing chart illustrating the operation of reproducing an LPP signal on the optical disk device according to the embodiment.

As shown in (5) and (6) of FIG. 4, the mark S/H switching signal 84 and the space S/H switching signal 86 have a relationship in which when one of them is High, the other is Low. As shown in a segment SE2 in which there is a timing offset, this relationship is such that a segment in which the mark S/H switching signal 84 is High fits in a segment in which a return beam from marks 12a shown in (3) is High while a segment in which the space S/H switching signal 86 is Low is wider than a segment in which the return beam is High.

This is intended to prevent the effect of unnecessary noise by avoiding rising and falling edges even if there is a timing offset during sampling in a segment in which the return beam is High.

The amplifiers 70 and 72 make gain adjustments according to difference in light quantity between return beams to justify the amplitudes of output signals 101 and 103 processed by the mark S/H circuit 66 and space S/H circuit 68. Incidentally, the amplitudes of the output signals 101 and 103 maybe justified by means of attenuation according to the difference in light quantity using attenuators instead of the amplifiers 70 and 72.

Figure 3:
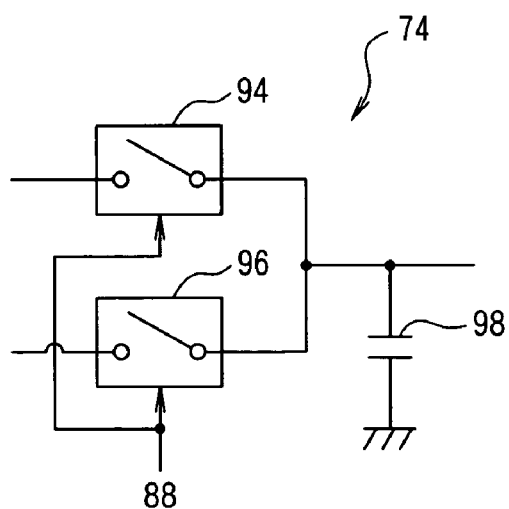
FIG. 3 is a diagram showing a configuration example of a mark/space selector switch of the optical disk device according to the embodiment.

As shown in FIG. 3, the mark/space selector switch 74 consists of switches 94 and 96 which are connected to signal output paths of the amplifiers 70 and 72 and are turned on and off according to the mark/space combining signal 88, and a capacitor 98 connected between a signal path connected with the output side of the switches 94 and 96 and the earth. It combines the signals whose amplitudes are justified by gain control of the amplifiers 70 and 72, according to the mark/space combining signal 88. In so doing, the switches 94 and 96 select signals of basically the same potential alternately and combine the selected signals, eliminating the need to set switch timing for the selection accurately or use high switching speed.

Incidentally, S/H circuits or adders may be used instead of the selector switches 94 and 96 shown in FIG. 3 for the mark/space selector switch 74.

The operation of reproducing a wobble signal and LPP signal on the optical disk device 60 will be described with reference to a timing chart in FIG. 4.

First, during recording, in a segment in which recording data shown in (1) is High, i.e., in a segment of High state which specifies a mark 12a to be formed, intensity of a laser beam directed at the optical disk 10 is increased by write strategy control performed by the LD driver 64 corresponding to the High state, causing a writing beam to provide write power as shown in (2). Since the optical disk 10 is a DVD-R/RW, the writing beam has a comb waveform.

The writing beam forms a mark 12a on the optical disk 10. In so doing, the waveform of a return beam used to read the A and D signals goes High by rising in the form of mountain ranges as shown in (3) and the waveform of a return beam used to read the B and C signals goes High by rising in the form of mountain ranges as shown in (4).

On the other hand, in a segment in which recording data is Low, i.e., in a segment of Low state which specifies a space 12b to be formed, intensity of the laser beam directed at the optical disk 10 is decreased (or turned off) by write strategy control performed by the LD driver 64 corresponding to the Low state, causing a writing beam to provide read power as shown in (2). In so doing, the waveform of a return beam goes Low as shown in (3) and (4). However, there are LPP signal components as indicated by P3 and P4 in the segment in which the return beam is Low.

As the return beams of the waveforms shown in (3) and (4) are detected by the photodetector 20, the A, B, C, and D signals are generated and supplied to the mark S/H circuits 66 and space S/H circuits 68 of the mark/space combining circuits 76a to 76d for the A, B, C, and D signals.

At the time when the A, B, C, and D signals whose return beams are High are supplied to the S/H circuits 66 and 68, the mark S/H switching signal 84 and space S/H switching signal 86 generated by the timing signal generator 78 corresponding to mark segments and space segments of the recording data, respectively, go High and Low, respectively, as shown in (5) and (6).

At the time when the mark S/H switching signal 84 goes High and the space S/H switching signal 86 goes Low, the High state of the mark S/H switching signal 84 turns on the switch 90 of the mark S/H circuit 66, and thus the A and D signals of the form corresponding to the comb waveform of the return beam shown in (3) are sampled as shown in (7) and the output signal 101 of the mark S/H circuit 66 goes High corresponding to the High-state, comb waveform of the return beam. Also, since the Low state of the space S/H switching signal 86 turns off the switch 90 of the space S/H circuit 68, the output signal 103 of the space S/H circuit 68 is held in Low state as shown in (8).

Conversely, at the time when the mark S/H switching signal 84 goes Low and the space S/H switching signal 86 goes High as shown in (5) and (6), the Low state of the mark S/H switching signal 84 turns off the switch 90 of the mark S/H circuit 66, and thus the output signal 101 of the mark S/H circuit 66 is held in Low state as shown in (7). Also, since the High state of the space S/H switching signal 86 turns on the switch 90 of the space S/H circuit 68, the Low-state, A and D signals of the return beam shown in (3) including the LPP signal component P3 are sampled, causing the output signal 103 of the space S/H circuit 68 to go Low with the LPP signal component P3 included as shown in (8).

Although the S/H process has been described citing only the S/H process of the A and D signals in (7) and (8), the B and C signals similarly go through the S/H process.

After the S/H process, the output signals 101 and 103 have their amplitudes justified to a fixed level by gain control of the amplifiers 70 and 72 and are combined by the mark/space selector switch 74 which controls combination according to the mark/space combining signal 88. Consequently, as shown in (9), the mark/space combining circuit 76a for the A signal outputs a Low-state, combined mark/space signal A1 containing comb waveforms in High state and an LPP signal component P3a. Similarly, the mark/space combining circuit 76d for the D signal outputs a Low-state, combined mark/space combining signal D1 containing comb waveforms in High state and an LPP signal component P3a.

Also, as shown in (10), the mark/space combining circuit 76b for the B signal outputs a Low-state, combined mark/space signal B1 containing comb waveforms in High state and an LPP signal component P4a. Similarly, the mark/space combining circuit 76c for the C signal outputs a Low-state, combined mark/space signal C1 containing comb waveforms in High state and an LPP signal component P4a.

The combined mark/space signal A1 is synthesized from only that components (High-state, comb waveforms) of the output signal 101 of the mark S/H circuit 66 which are sampled and indicated by a solid line in (7) and that components (Low-state waveforms including the LPP signal component P3a) of the output signal 103 of the space S/H circuit 68 which are sampled and indicated by a solid line in (8), and it does not contain the held components indicated by dotted lines in (7) and (8). This is because the mark/space selector switch 74 causes only sampled signal components to be outputted out of the output signal 101 of the mark S/H circuit 66 and the output signal 103 of the space S/H circuit 68. Since the reliable, sampled signal components excluding the held components are combined in this way, the combined mark/space signal A1 has high quality. The same is true to the other combined mark/space signals B1 to D1.

The combined mark/space signals A1 to D1 are processed by the wobble processing circuit 80 to reproduce an LPP signal 105 shown in (11).

A wobble signal 107 is not shown in FIG. 4 used to describe the reproduction of the LPP signal 105 because it differs greatly in frequency scale. The wobble signal 107 has a waveform illustrated exaggeratedly in FIG. 5.

Figure 5:
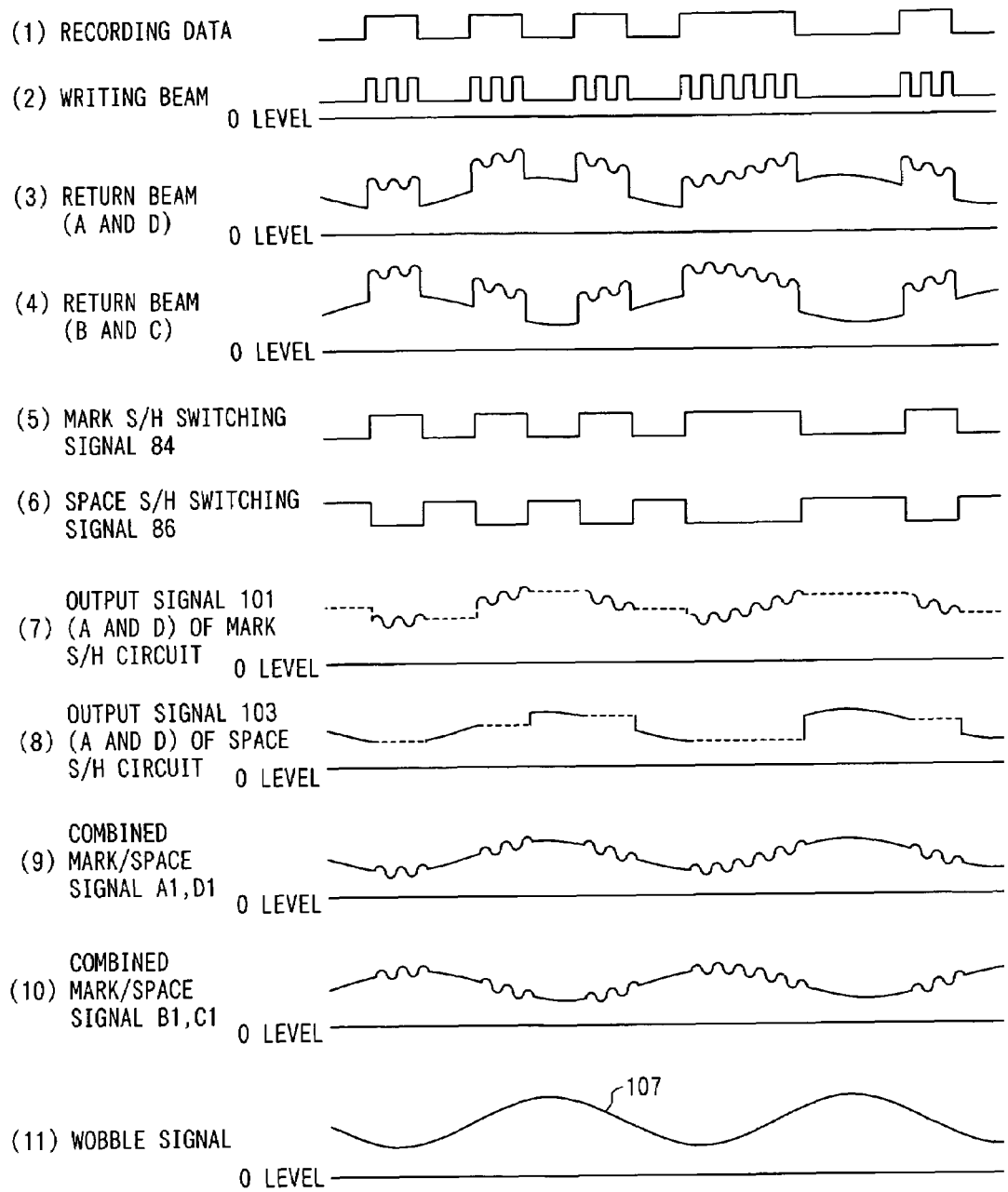
FIG. 5 is a timing chart illustrating the operation of reproducing an wobble signal on the optical disk device according to the embodiment.

Specifically, a sin wave which is a wobble signal component is superimposed on the entire return beam as shown in (3) and (4) of FIG. 5, and thus the wobble signal component is superimposed on both mark and space output signals 101 and 103 shown in (7) and (8) of FIG. 5 as well as on the combined mark/space signals A1 to D1 shown in (9) and (10) of FIG. 5.

Then, as the combined mark/space signals A1 to D1 are processed by the wobble processing circuit 80, the sine-wave wobble signal 107 is reproduced as shown in (11) of FIG. 5.

Thus, with the optical disk device 60 according to this embodiment, the mark S/H circuit 66 samples a signal A generated as the photodetector 20 detects a return beam from the marks 12a of the optical disk 10, the space S/H circuit 68 samples a signal A generated as the photodetector 20 detects a return beam from the spaces 12b, and the amplitudes of the sampled A signals from the marks and spaces are justified by the amplifiers 70 and 72. The mark and space signals whose amplitudes have been justified are selected alternately and combined by the mark/space selector switch 74. After the A, B, C, and D signals from the photodetector 20 are subjected to a series of processes up to the combination process, the wobble processing circuit 80 adds them in predetermined combinations, finds differences among the added signals after justifying the amplitudes of the added signals, and thereby reproduces the wobble signal 107 and LPP signal 105.

That is, the signal from the marks 12a is sampled, the signal from the spaces 12b is sampled, the amplitudes of the sampled signals are justified, and then the signals are combined by being selected alternately. Consequently, signals of basically the same potential are combined by being selected alternately, eliminating the need to set switch timing for the selection accurately or use high switching speed. This makes it possible to combine the signals from the marks and spaces easily and properly.

Also, since the signal sampling segments of the marks 12a are set shorter than the signal segments of the marks 12a so that the sampling segments will fit in the signal segments and the signal sampling segments of the spaces 12b are set shorter than the signal segments of the spaces 12b so that the sampling segments will fit in the signal segments, the signals from the marks 12a and spaces 12b can be sampled reliably.

Consequently, the signal sampling segments of the marks 12a and spaces 12b are set apart from each other, making it possible to avoid rising and falling edges of the signal in the marks 12a during sampling even if there is a timing offset. This in turn makes it possible to prevent the effect of unnecessary noise which would be produced if the rising and falling edges are sampled.

Thus, the wobble signal 107 and LPP signal 105 can be reproduced with high quality.

Figure 6:
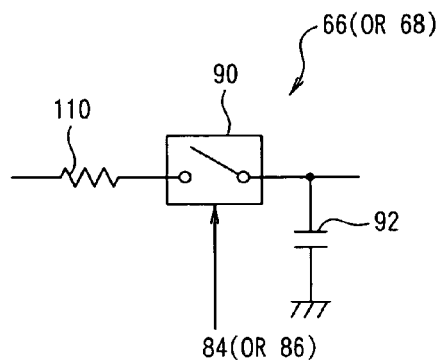
FIG. 6 is a diagram showing an example in which the S/H circuit of the optical disk device according to the embodiment is configured with an LPF.

Besides, the mark S/H circuit 66 and space S/H circuit 68 maybe equipped with an LPF (Low Pass Filter). For example, a resistor 110 may be added to the input side of the switch 90 as shown in FIG. 6.

The use of the mark/space S/H circuits equipped with an LPF produces the following effects. When a return beam contains sharp rising edges indicated by P5 and P6 as shown in a timing chart (1) in FIG. 7, if the return beam is sampled using the mark S/H switching signal 84 shown in (2) of FIG.

Figure 7:
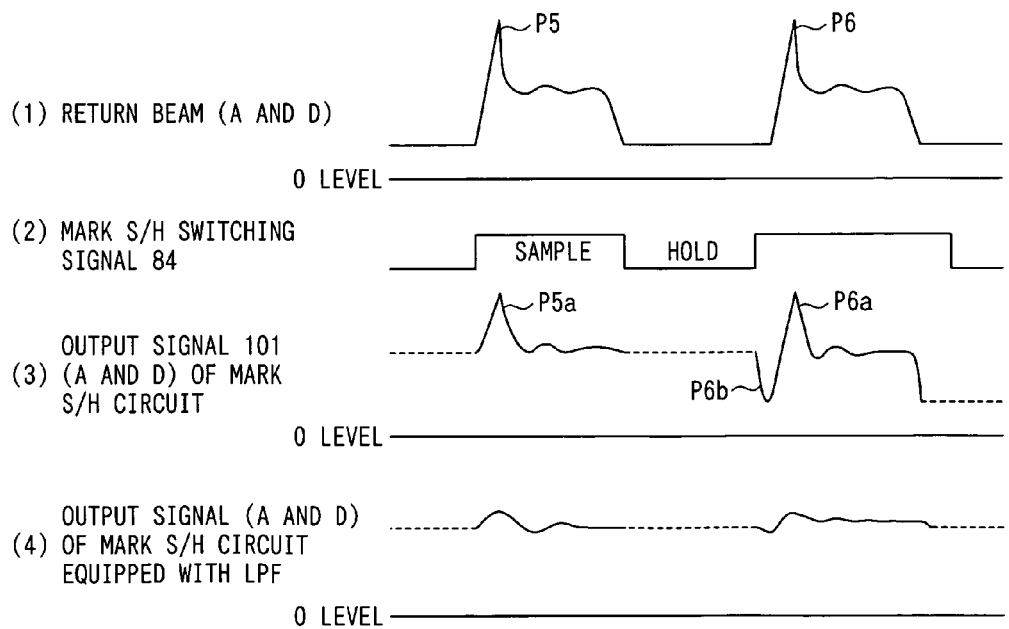
FIG. 7 is a timing chart illustrating characteristics obtained when the S/H circuit of the optical disk device according to the embodiment is configured with the LPF.

7, the use of a mark S/H circuit 66 without an LPF causes the sharp rising edges indicated by P5 and P6 to remain as noise, as indicated by P5*a*, P6*a*, and P6*b* in (3) of FIG. 7.

However, the use of mark/space S/H circuits equipped with an LPF makes it possible to remove the sharp rising edges P5 and P6 with the LPF as shown in (4) of FIG. 7. Thus, both wobble signal 107 and LPP signal 105 can be reproduced with high quality.

INDUSTRIAL APPLICABILITY

A signal generated through the detection of a return beam from marks of an optical disk is sampled, a signal generated through the detection of a return beam from spaces is sampled, the amplitudes of the sampled signals are justified, and the signals are combined by being selected alternately. That is, signals of basically the same potential are combined by being selected alternately, eliminating the need to set switch timing for the selection accurately or use high switching speed. This makes it possible to combine the signals from the marks and spaces easily and properly.

The invention claimed is:

1. An optical disk device which reproduces a wobble signal, i.e., information about wobbling of tracks, from an optical disk that has information-recording tracks formed spirally from inner radius to outer radius of the disk, wobbling periodically, characterized by comprising:
   mark forming means which forms marks on the tracks by laser irradiation according to recording data;
   a split-type optical sensor which outputs multiple systems of signals by detecting return beams from the marks as well as from spaces between the marks;
   first sampling means which samples, in mark segments, the signals outputted from the split-type optical sensor and outputs the sampled signals;
   second sampling means which samples, in space segments, the signals outputted from the split-type optical sensor which outputs sampled signals;
   first amplitude adjusting means which justifies amplitudes of the signals sampled and outputted by the first sampling means;
   second amplitude adjusting means which justifies amplitudes of the signals sampled and outputted by the second amplitude adjusting means;
   selection means which alternately selects and outputs the signals outputted by the first and second amplitude adjusting means by alternatively selecting the signal outputted from the first amplitude adjusting means in the mark segments and the signal outputted from the second amplitude adjusting means in the space segments; and
   reproducing means which adds the multiple systems of signals that have been subjected to a series of processes by the first sampling means, the second sampling means, and the selection means, in predetermined combinations, finds differences among the added signals after justifying amplitudes of the added signals, and thereby reproduces the wobble signal.

2. An optical disk device which reproduces a land pre-pit signal from an optical disk that has information-recording tracks formed spirally from inner radius to outer radius of the disk, wobbling periodically, with land pre-pits for reproduction of address information being formed between the tracks, characterized by comprising:
   mark forming means which forms marks on the tracks by laser irradiation according to recording data;
   a split-type optical sensor which outputs multiple systems of signals by detecting return beams from the marks as well as from spaces between the marks;
   second sampling means which samples, in space segments, the signals outputted form the split-type optical sensor and outputs the sampled signals;
   first amplitude adjusting means which justifies amplitudes the signals sampled and outputted by the first sampling means;
   second amplitude adjusting means which justifies amplitudes of the signals sampled and outputted by the second sampling means;
   selection means which alternately selects and outputs the signals outputted by the first and second amplitude adjusting means by alternatively selecting the signal outputted from the amplitude adjusting means in the mark segments and the signal outputted from the second amplitude adjusting means in the space segments; and
   reproducing means which adds the multiple systems of signals that have been subjected to a series of processes by the first sampling means, the second sampling means, and the selection means, in predetermined combination, finds differences among the added signals after justifying amplitudes of the added signals, and thereby reproduces the land pre-pit signal.

3. The optical disk device according to claim 1 or 2, in that the first amplitude adjusting means controls gain based on difference between light quantity of a return beam from the marks and light quantity of a return beam from the spaces.

4. The optical disk device according to claim 1 or 2, characterized in that the second amplitude adjusting means controls gain based on difference between light quantity of a return beam from the marks and light quantity of a return beam from the spaces.

5. The optical disk device according to claim 1 or 2, characterized by comprising timing generating means which generates a control signal for use to control timing for the first sampling means to sample the signals outputted from the split-type optical sensor in mark segments, a control signal for use to control timing for the second sampling means to sample the signals outputted from the split-type optical sensor in space segments, and a control signal for use to control timing for the selection means to alternately select the signals outputted from the first and second amplitude adjusting means, according to the recording data.

6. The optical disk device according to claim 1 or 2, characterized in that:
   when signals from the marks are sampled by the first sampling means, sampling segments are set shorter than signal segments of the marks so that the sampling segments will fit in the signal segments; and
   when the signals from the spaces are sampled by the second sampling means, sampling segments are set shorter than signal segments of the spaces so that the sampling segments will fit in the signal segments.

7. The optical disk device according to claim 1 or 2, characterized in that both the first and second sampling means have a switch used to sample the signals outputted from the split-type optical sensor and a capacitor connected to an output end of the switch and used to hold the sampled signals.

8. The optical disk device according to claim 7, characterized in that:
   the first sampling means samples the signals in the mark segments by turning on the switch and charging the capacitor with electrical charge of the signals outputted from the split-type optical sensor and holds the signals in the spaces by turning off the switch and outputting the electrical charge, and the sampling means samples the signals in the spaces by turning on the switch and charging the capacitor with electrical charge of the signals outputted from the split-type optical sensor and holds the signals in the marks by turning off the switch and outputting the electrical charge.

9. The optical disk device according to claim 1 or 2, characterized in that both the first and second sampling means have a low pass filter.

10. The optical disk device according to claim 1 or 2, characterized in that the selection means has a switch used to alternately select the signals sampled and outputted by the first and second sampling means and a capacitor used to hold the selected signals.

11. A circuit for an optical disk device intended for an optical disk which has information-recording tracks formed spirally from inner radius to outer radius of the disk, wobbling periodically, where the optical disk device forms land pre-pits for reproduction of address information being formed between the tracks, marks on the tracks by laser irradiation according to recording data, outputs multiple systems of signals by detecting return beams from the marks as well as from spaces between the marks using a split-type optical sensor, and thereby reproduces a wobble signal, i.e., information about wobbling of the tracks, characterized by comprising:

first sampling means which samples, in mark segments, the signals outputted from the split-type optical sensor and outputs the sampled signals;

second sampling means which samples, in space segments, the signals outputted from the split-type optical sensor and outputs the sampled signals;

first amplitude adjusting means which justifies amplitudes of the signals sampled and outputted by the first sampling means;

second amplitude adjusting means which justifies amplitudes of the signals sampled and outputted by the second sampling means;

selection means which alternately selects and outputs the signals outputted by the first and second amplitude adjusting means by alternatively selecting the signal outputted from the amplitude adjusting means in the mark segments and the signal outputted from the second amplitude adjusting means in the space segments; and reproducing means which adds the multiple systems of signals that have been subjected to a series of processes by the first sampling means, the second sampling means, and the selection means, in predetermined combinations, finds differences among the added signals after justifying amplitudes of the added signals, and thereby reproduces the wobble signal.

12. A circuit for an optical disk device intended for an optical disk which has information-recording tracks formed spirally from inner radius to outer radius of the disk, wobbling periodically, with land pre-pits for reproduction of address information being formed between the tracks, where the optical disk device forms marks on the tracks by laser irradiation according to recording data, outputs multiple systems of signals by detecting return beams from the marks as well as from spaces between the marks using a split-type optical sensor, and thereby reproduces a land pre-pit signal, characterized by comprising:

first sampling means which samples, in mark segments, the signals outputted from the split-type optical sensor and outputs the sampled signals;

second sampling means which samples, in space segments, the signals outputted from the split-type optical sensor and outputs the sampled signals;

first amplitude adjusting means which justifies amplitudes of the signals sampled and outputted by the first sampling means;

second amplitude adjusting means which justifies amplitudes of the signals sampled and outputted by the second sampling means;

selection means which alternately selects and outputs the signals outputted by the first and second amplitude adjusting means by alternatively selecting the signal outputted from the first amplitude adjusting means in the mark segments and the signal outputted from the second amplitude adjusting means in the space segments; and reproducing means which adds the multiple system of signals that have been subjected to a series of processes by the first sampling means, the second sampling means, and the selection means, in predetermined combinations, finds differences among the added signals after justifying amplitudes of the added signals, and thereby reproduces the land pre-pit signal.

13. A wobble signal reproduction method for reproducing a wobble signal, i.e., information about wobbling of tracks, from an optical disk that has information-recording tracks formed spirally from inner radius to outer radius of the disk, wobbling periodically, characterized by comprising:

a first step of forming marks on the tracks by laser irradiation according to recording data;

a second step of outputting multiple systems of signals by detecting return beams from the marks formed in the first step as well as from spaces between the marks, with a split-type optical sensor;

a third step of sampling, in mark segments, the signals outputted from the split-type optical sensor and outputting the sampled signals;

a fourth step of sampling, in space segments, the signals outputted from the split-type optical sensor and outputting the sampled signals;

a fifth step of justifying amplitudes of the signals sampled and outputting in the mark segments and spaces segments; and a sixth step of alternately selecting and outputting the signals outputted in the third, fourth, and fifth sampling steps; and a seventh step of adding the multiple systems of signals that have been subjected to a series of processes in the third, fourth, fifth, and sixth steps, in predetermined combinations, finding differences among the added signals after justifying amplitudes of the added signals, and thereby reproducing the wobble signal.

14. A land pre-pit signal reproduction method for reproducing a land pre-pit signal from an optical disk that has information-recording tracks formed spirally from inner radius to outer radius of the disk, wobbling periodically, with land pre-pits for reproduction of address information being formed between the tracks, characterized by comprising:

a first step of forming marks on the tracks by laser irradiation according to recording data;

a second step of outputting multiple systems of signals by detecting return beams from the marks formed in the first step as well as from spaces between the marks, with a split-type optical sensor;

a third step of sampling, in mark segments, the signals outputted from the split-type optical sensor and outputting the sampled signals;

a fourth step of sampling, in space segments, the signals outputted from the split-type optical sensor and outputting the sampled signals;

a fifth step of justifying amplitudes of the signals sampled and outputted in the mark segments and space segments;

a sixth step of alternately selecting and outputting the signals outputted in the third, fourth, and fifth sampling steps, and a seventh step of adding the multiple systems of signals that have been subjected to a series of processes in the third, fourth, fifth and sixth steps, in predetermined combinations, finding differences among the added signals after justifying amplitudes of the added signals, and thereby reproducing the land pre pit signal.

* * * * *